United States Patent
Hara et al.

[11] Patent Number: 5,820,813
[45] Date of Patent: Oct. 13, 1998

[54] METHOD FOR PRODUCING MULTILAYER MOLDED ARTICLE

[75] Inventors: Takahisa Hara, Kawanishi; Masahito Matsumoto, Osaka; Nobuhiro Usui, Osaka; Takeo Kitayama, Osaka; Shigeyoshi Matubara, Osaka, all of Japan

[73] Assignee: Sumitomo Chemical Company, Limited, Osaka, Japan

[21] Appl. No.: 419,525

[22] Filed: Apr. 10, 1995

Related U.S. Application Data

[63] Continuation of Ser. No. 30,236, Mar. 30, 1993, abandoned.

[30] Foreign Application Priority Data

Jul. 31, 1991 [JP] Japan .................................. 3-191689

[51] Int. Cl.⁶ .......................... B29C 33/02; B29C 33/18; B29C 45/14
[52] U.S. Cl. .......................... 264/511; 264/266; 264/327
[58] Field of Search .................... 264/509, 510, 264/511, 513, 247, 266, 275, 294, 327, 255

[56] References Cited

U.S. PATENT DOCUMENTS

| | | | |
|---|---|---|---|
| 3,703,572 | 11/1972 | Bellasalma | 264/510 |
| 3,751,540 | 8/1973 | Prahl, Jr. et al. | 264/510 |
| 4,360,329 | 11/1982 | Hatekeyama | 264/247 |
| 4,639,341 | 1/1987 | Hanamoto | 264/511 |
| 4,710,338 | 12/1987 | Bagnall et al. | 264/510 |
| 4,994,224 | 2/1991 | Itoh et al. | 264/247 |
| 5,006,188 | 4/1991 | Usui et al. | |
| 5,091,031 | 2/1992 | Strapazzini | 264/511 |
| 5,352,397 | 10/1994 | Hara et al. | 264/266 |
| 5,603,889 | 2/1997 | Ohno | 264/510 |

FOREIGN PATENT DOCUMENTS

| | | | |
|---|---|---|---|
| 333 198 | 9/1989 | European Pat. Off. | 264/266 |
| 0371743 | 6/1990 | European Pat. Off. | |
| 0466179 | 1/1992 | European Pat. Off. | |
| 2251111 | 10/1987 | Japan | 264/266 |
| 1275020 | 2/1989 | Japan | |
| 1235613 | 9/1989 | Japan | |

OTHER PUBLICATIONS

Patent Abstracts of Japan, Publication No. JP3262615, published Nov. 22, 1991.

*Primary Examiner*—Angela Ortiz
*Attorney, Agent, or Firm*—Birch, Stewart, Kolasch & Birch, LLP

[57] ABSTRACT

A method for producing a multilayer molded article by facing a preheating panel on which a preheated skin material is placed towards one of upper and lower molds, forming a closed space by the mold and the preheating panel, evacuating the closed space to suck the skin material onto a surface of the mold, removing the preheating panel, supplying a resin through a resin conduit with closing the molds or temporarily stopping mold closing, and finishing the mold closing. By this method, a multilayer molded article having a resin body which is made by deep drawing or has a complicated shape and a skin material laminated on a surface of the resin body can be produced.

9 Claims, 4 Drawing Sheets

METHOD FOR PRODUCING MULTILAYER MOLDED ARTICLE

This application is a continuation of application Ser. No. 08/030,236 filed on Mar. 30, 1993, now abandoned.

BACKGROUND OF THE INVENTION

1. Field of the Invention

The present invention relates to a method for efficiently producing a multilayer molded article comprising a resin body and a skin material which is integrally laminated on a surface of the resin body.

2. Description of Related Art

Hitherto, various proposals have been made and practically employed for laminating a skin material on a surface of a resin molded article to impart soft feeling and high quality to the molded article.

For example, there are known (1) a method comprising molding a resin body as a core layer by a suitable molding method such as injection molding and laminating a skin material which has been separately formed by, for example, thermoforming on the surface of the resin body using an adhesive; (2) a method comprising placing a premolded core layer and a skin material in a mold, injecting a urethane between them and foaming the urethane to obtain a multilayer molded article having an intermediate foam layer; (3) a method comprising placing a skin material in a mold for injection molding and injecting a resin melt in the mold; and (4) a method comprising supplying a skin material and a resin melt between unclosed molds and pressing and cooling the mold to obtain a multilayer molded article, which method is disclosed in Japanese Patent Kokai Publication No. 235613/1989.

However, the above methods for producing the multilayer molded article have the following drawbacks.

In the methods (1) and (2), the production cost increases since the number of process steps is large. Since the injection molding method (3) is carried out under a high pressure, the skin material is damaged by pressure and heat during molding so that the kinds of skin materials which can be practically used are very limited. Since the method (4) can mold the article under a pressure of only one-third to one-fifth of that of injection molding, the skin material is not damaged during molding and multilayer molded articles having various skin materials are produced. But, in this method, when the molded article has a deep drawn shape or a complicated shape, the skin material hardly follows the shape of article so that the skin material tends to be broken.

To solve the above problems, it may be contemplated to place a skin material, which has been preformed by thermoforming using a preforming mold having the same size as the molding mold, in the molding mold. However, due to variation of preforming conditions, the preformed skin material may not fit the surface of molding mold. When various skin materials are preformed using a single preforming mold, since each skin material has a different shrinkage factor from others, the preformed skin material may not fit the surface of the molding mold. In addition, the number of molding process steps increases, for example, precisely placing the separately preformed skin material on the surface of the molding mold, resulting in an increase of the production cost.

SUMMARY OF THE INVENTION

As a result of extensive study to solve the problem of the above method (4), the present invention has been completed.

Accordingly, the present invention provides a method for producing a multilayer molded article having a resin body and a skin material which is laminated on a surface of the resin body, comprising the steps of:

(1) facing a preheating panel 1 on which a preheated skin material is placed towards one of upper and lower molds, (2) contacting said preheating panel 1 to an outer periphery 7 of said one of upper and lower molds through a peripheral part of skin material to form a closed space, evacuating said closed space through a hole 11 provided in said one of upper and lower molds to suck said preheated skin material 6 onto a surface of said one of upper and lower molds, (3) removing said preheating panel 1 from said one of upper and lower molds and supplying a molten thermoplastic resin between said skin material 6 and the other one of upper and lower molds through a resin conduit 16 provided in the other one of upper and lower molds, with closing the molds or temporarily stopping mold closing, and (4) closing the molds to the final position, and pressing and cooling them.

DETAILED DESCRIPTION OF THE INVENTION

As the thermoplastic resin to be used in the method of the present invention, any resin which is used in injection molding and extrusion molding can be used. Examples of the thermoplastic resins are polypropylene, polyethylene, polystyrene, acrylonitrile-butadiene-styrene copolymer, polyamide, polyvinyl chloride and the like.

Examples of the skin material to be used in the method of the present invention are a sheet of a thermoplastic resin (e.g. polyvinyl chloride, polystyrene, polypropylene, acrylonitrile-butadiene-styrene copolymer, polyamide, etc.), a sheet of thermoplastic elastomer, a leatherlike sheet made of an embossed sheet of these materials, a laminate of the above sheet and a woven, knit or nonwoven fabric, and a laminate of the above sheet and a foam sheet lined on its back (e.g. polyethylene foam sheet, polypropylene foam sheet, polyurethane foam sheet, etc.).

The molding method of the present invention will be illustrated by making reference to the accompanying drawings.

FIGS. 1–6 schematically show the apparatus in various steps in one preferred embodiment of the present invention.

A preheating panel 1 can carry a preheated skin material and can be transferred to molding molds. The panel may be set up integrally with a heating source or separately from a heating source. In the former case, a heater 1a is embedded inside the panel, and a surface of the panel can be made in various shapes such as a flat face or a semispherical face so that the skin material is carried thereon, whereby the preheating panel is made integral with the heating source. In the latter case, a heater is detachably provided under the preheating panel having a desired shape, or an infrared or far infrared heater 1b is provided above the preheating panel. They may be combined in one preheating panel.

Figure 1:
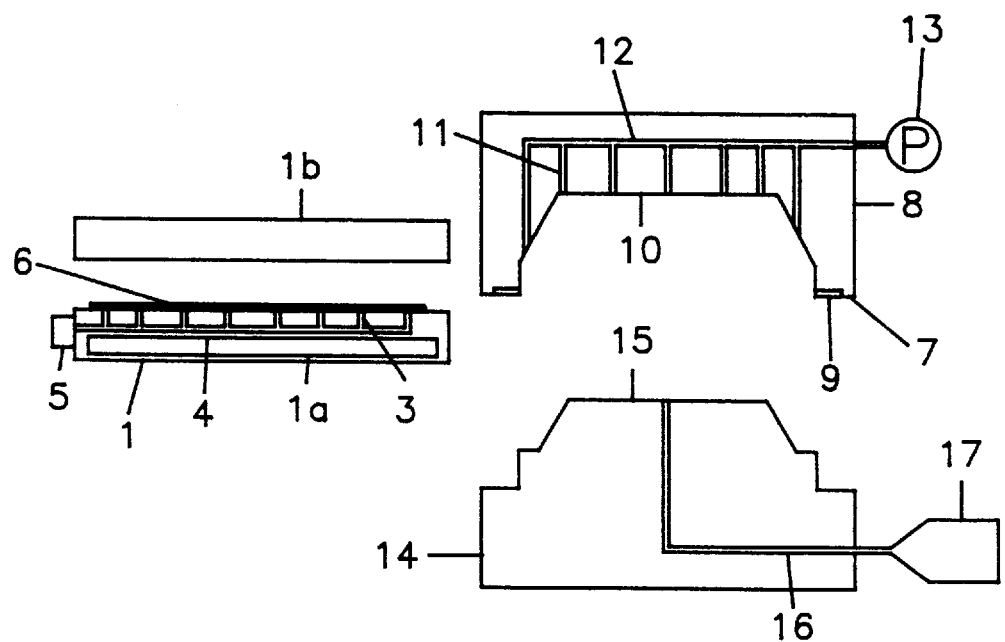
FIGS. 1–6 show cross sectional views of the molding apparatus in various steps of one preferred embodiment of the present invention method.

In FIG. 1, heating with the infrared heater above the panel is combined with the preheating panel having an electric heater which is integrally embedded inside the panel.

An upper face of the preheating panel 1 on which the skin material is placed has plural small holes 3, which are communicated with a conduit 4 provided inside the panel. The conduit 4 is communicated with a vacuum line connected to a vacuum pump or a compressed air line connected to a compressor, through a directional control valve 5. By operating the valve 5, the skin material is sucked on or separated from the mold surface by supplying compressed air through the holes 3.

When the skin material 6 is preheated on the preheating panel to a temperature suitable for preforming the skin material, the preheating panel 1 is transferred between the upper and lower molds and the skin material is faced towards the upper mold surface. In general, the skin material is sucked and fixed onto the preheating panel by vacuum suction through the holes 3 to prevent shifting while it is placed on the panel.

Figure 2:
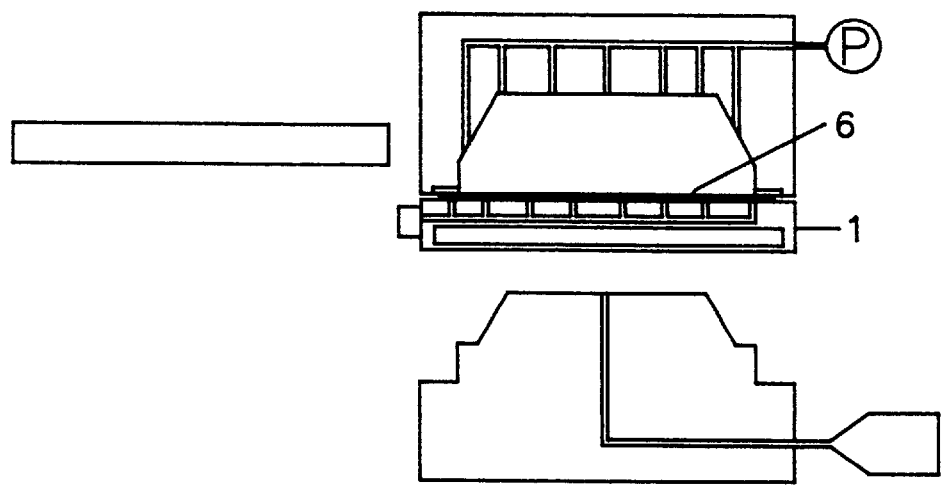

While, in FIG. 2, the skin material faces the mold surface of the upper mold, when the skin material faces the mold surface of lower mold, it is possible to turn over the panel since the skin material is sucked and fixed onto the preheating panel by vacuum suction through the holes 3.

Figure 3:
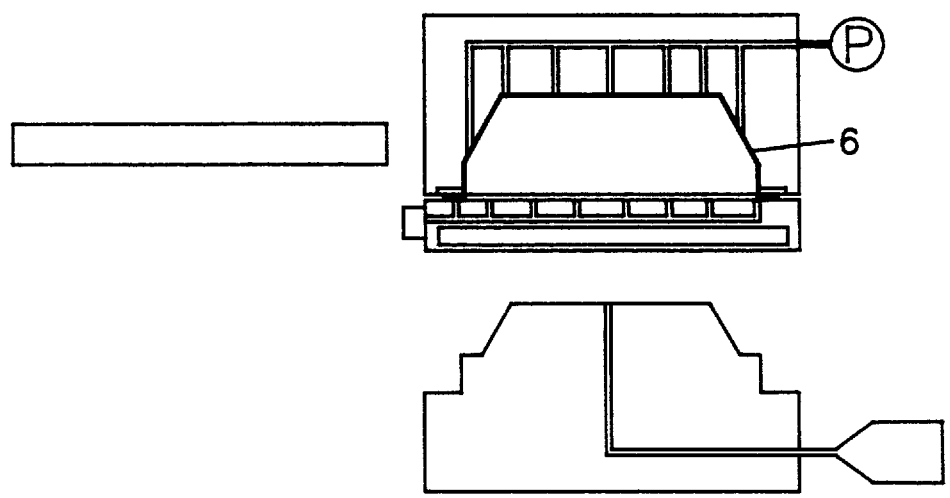

By lowering the upper mold or lifting up the preheating panel, the preheating panel 1 is contacted with a heat resistant packing 9 attached to a peripheral face 7 of the upper mold through the peripheral part of the skin material 6, whereby a closed space is formed between the preheating panel 1 and the upper mold surface 10 (FIG. 2). At this time, the directional control valve 5 is operated to supply the compressed air through the holes 3 via the conduit 4 and simultaneously the vacuum pump 13 which is connected to a conduit 12 communicating with plural holes 11 provided in the upper mold surface 10 is operated. Then, the skin material 6 is sucked and adhered to the upper mold surface 10. Since the peripheral part of the skin material is fixed by the contacting force between the peripheral face 7 of the upper mold and the preheating panel 1, the skin material is expanded and sucked on the upper mold surface (FIG. 3). An expansion degree of the skin material depends on the kind, shape and preheating temperature of the skin material, and the skin material can be expanded 2 to 3 times the size before being heated. A required expansion ratio is easily known from a relationship between a surface area of the preheating panel and a surface area of the final molded article, and it is important to select a skin material which satisfies a required expansion ratio.

In the step of transferring to and sucking the preheated skin material on the molding surface of the mold, if the molding surface has a pattern such as an emboss, the emboss pattern will be transferred to the skin material.

After the completion of transfer and sucking of the skin material on the molding surface, the preheating panel 1 is returned to the original position (FIG. 4) to preheat, if desired, the skin material for the subsequent molding cycle.

Figure 5:
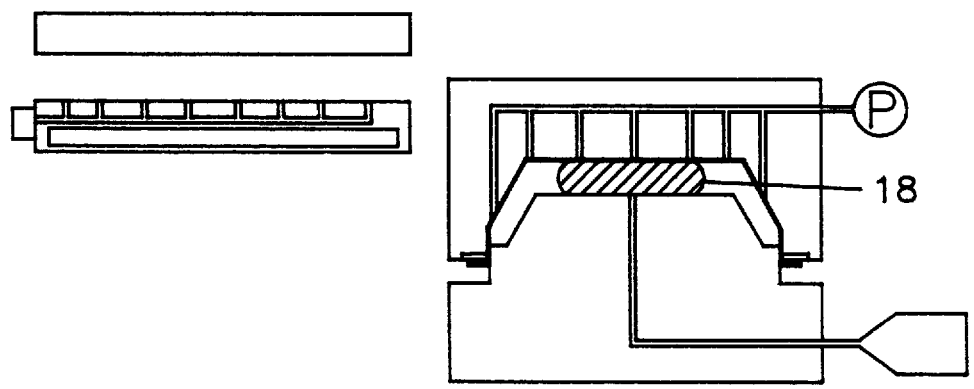

The upper mold 8 is attached to a hydraulically vertically movable upper platen of the press machine and moved by a hydraulic pressure towards the lower mold 14 attached to a fixed lower platen (not shown) so that the molds are closed. When the upper mold to which the skin material is sucked is lowered and a suitable clearance is reached, a determined amount of resin melt is supplied between the skin material sucked to the upper mold and the molding surface of the lower mold through a resin conduit provided in the lower mold. In FIG. 5, when the clearance between the upper mold surface 10 and the lower mold surface 15 reaches about 10 mm, the mass of resin melt 18 is supplied between the sucked skin material 6 and the lower mold surface 15 from a molten resin supplier 17 through the resin conduit 16 provided in the lower mold 14.

After the completion of the sucking of skin material to the upper mold and before the start of resin supply, it may be possible to cut a marginal peripheral part of the skin material with suitable cutting means which is provided around the outer periphery of the upper mold and trim the skin material in a desired shape.

Irrespective of the trimming of skin material, for improving appearance of the produced multilayer molded article, it is effective to forcibly cool the sucked skin material, for example, by blowing an air onto the skin material.

Figure 6:
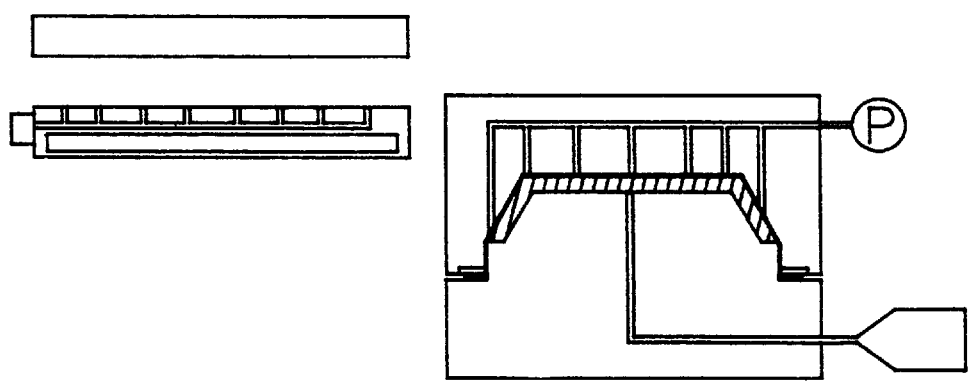

After the supply of the resin melt, as the upper mold 8 is further lowered, the resin melt 18 flows into the space between the skin material 6 and the lower mold surface 15 towards its edges of the molds and fills the edges of the space (FIG. 6). Then, the molds are pressed and cooled for a suitable time, the upper mold is lifted up and the desired multilayer molded article is removed from the mold.

Figure 7:
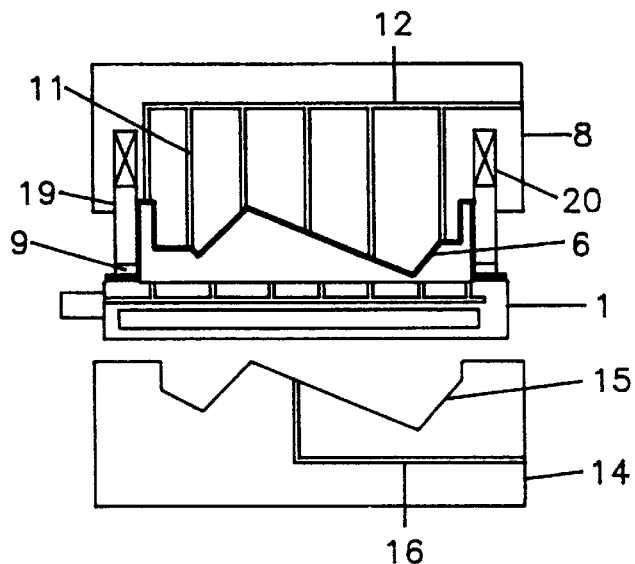
FIGS. 7–9 show cross sectional views of the molding apparatus in various steps of another preferred embodiment of the present invention method.

Another preferred embodiment will be explained. In the above embodiment, since the outer periphery of the female mold surface on which the skin material is sucked is on the same plane and said mold is a concave one, the closed space is formed between the female mold surface 10 and the preheating panel 1 by simply contacting the flat preheating panel 1 to the tip ends of the female mold and the skin material can be sucked onto the mold. When the molding surface protrudes beyond the plane formed by the peripheral face of the upper mold surface to which the preheating panel is contacted as shown in FIG. 7, or when the peripheral face of the molding surface is not on the same plane, it is impossible to contact the flat preheating panel to the peripheral face 7 of the upper mold, so that no closed space is formed. The molding method in such case will be explained by making reference to FIGS. 7, 8 and 9.

Figure 8:
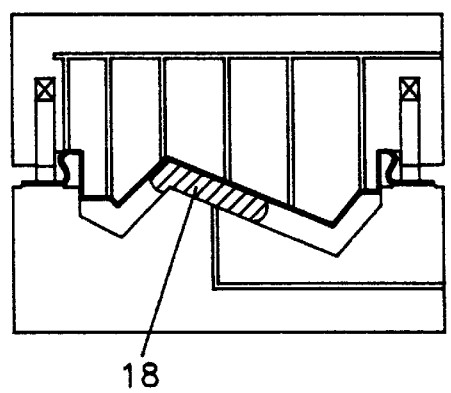
Figure 9:
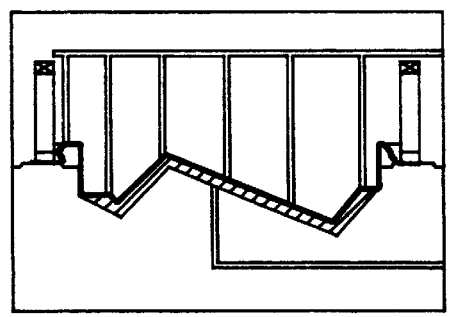

In FIGS. 7, 8 and 9, a frame 19 is newly provided, which can be vertically moved with expansion means 20 along the side wall of the upper mold. In the unexpanded state of the expansion means, the lower edges of whole periphery of the frame 19 are on the same plane, and a heat-resistant packing 9 is attached to those edges. As the expansion means, a spring, an air cylinder, a hydraulic cylinder, and the like can be used.

As in the previous embodiment, the preheating panel 1 carrying the preheated skin material is transferred between the upper and lower molds and the skin material is faced towards the upper mold surface. When the upper mold is lowered or the preheating panel is lifted up, the lower ends of the frame 19 are contacted to the preheating panel by the expansion means 20 through the heat-resistant packing 9 and the peripheral part of the skin material 6, whereby a closed space is formed by the preheating panel 1, the upper mold surface and the frame 19. Then, in the same way as in the previous embodiment, the compressed air is supplied through the directional control valve 5 of the preheating panel and simultaneously the skin material is vacuum sucked through the holes 11 in the upper mold to suck and fix the skin material on the male mold surface (FIG. 7).

Thereafter, the molding is carried out in the same manner as in the previous embodiment. FIG. 9 shows the final mold closing position, in which the expansion means is further contracted, since the force exerted by the expansion means is smaller than the clamping force and the frame 19 is substantially recessed in the upper mold.

Since the molding method of the present invention is one of the heat-compression molding methods, its molding pressure is as low as only one third to one fifth of the pressure in the injection molding, and the skin material is is unlikely to be damaged during the molding. But, with some skin materials, the appearance of the molded article may be damaged by pressure and heat even at such low pressure. To prevent such damage of the skin material, the resin melt is preferably supplied when the cavity clearance reaches a distance between (C+0.1) mm and (C+100) mm (wherein C is a clearance between the molding surfaces 10, 15 of the upper and lower molds at the completion of the molding) while the mold closing is stopped temporarily or decreased to a rate of 30 mm/sec. or less.

The preheating panel 1 is made of a metal such as iron, copper or aluminum when it is integrally formed with the heating source or when the heater is mainly heated by heat conduction from the heat source such as a heater which is detachably provided under the preheating panel. When the heating source heats the preheating panel by radiation heat such as infrared or far infrared, the preheating panel can be made of a material having a low thermal conductivity such as a ceramic. While any heat resistant material can be used, its surface is preferably smooth so that the placed skin material can uniformly contact thereto.

For preheating the skin material, the skin material may be heated so that its whole surface is uniformly heated at the same temperature, or a temperature of the skin material may be changed from part to part, varied on different portions thereof, by establishing a temperature profile on the preheating panel, whereby elongation of the skin material can be adjusted when it is being sucked on the mold. Such heating manner is suitably employed according to the kind of skin material and/or the shape of molded article.

In general, the hole 3 provided in the preheating panel 1 has a round cross section, while its cross sectional shape is not critical in view of its effect.

When a diameter or a largest width (in the case of other than a round shape) of the hole is too large, a mark of hole remains on the surface of multilayer molded article though the suction force is large. Then, it is essential that a hole having a size such that no mark remains is provided. The size of such hole is usually from 0.05 to 3 mm depending on the kind of skin material or molding conditions.

The number and arrangement of the holes are so selected that the skin material is not removed from the preheating panel 1 or dislocated when being sucked.

In general, the holes are formed by boring the preheating panel. If desired, a thin pipe of ceramics or stainless steel may be inserted and fit in the holes on a part or whole surface area of the panel.

The above considerations can apply to the holes 11 of the molding mold.

Usually, the holes are discontinuously provided on the panel surface, while grooves each having a width corresponding to the above hole size may be formed. In such case, the grooves are formed directly on the preheating panel or formed by providing heat resistant blocks with a distance in the above size range.

In the present invention, the preheating skin material is sucked on the molding surface of the mold and then the resin melt is supplied to laminate them together. The preforming of the skin material and the lamination molding of the skin material and the resin are carried out in the same molds.

EFFECTS OF THE INVENTION

According to the present invention, the multilayer molded article comprising a core molded body made by deep drawing or having a complicated shape on which the skin material is laminated can be efficiently produced. Such molded article can be preferably used as a vehicle parts, light electrical appliances, and the like. In particular, it is suitable as an interior part of an automobile such as an instrument panel pad.

EXAMPLES

The present invention will be explained further in detail by the following Examples, which do not limit the scope of the present invention.

Example 1

A multilayer molded article was produced by the apparatus and method shown in FIGS. 1–6.

As the preheating panel 1, a heating source-integral type one in which the electric heater 1a was installed and which had a smooth surface was used. The panel surface had sizes of 20×30 cm and 12 holes each having a diameter of 1 mm and its upper surface was heated at 165° C.

As a skin material, there was used an embossed polyvinyl chloride sheet having a thickness of 0.7 mm which was lined with an expandable fabric (manufactured by Kyowa Leather Co. Ltd.). The skin material was placed on the preheating panel with its embossed face upside and its upper surface was heated with the infrared heater 1b so that the temperatures of the embossed face and back face were 160° C. and 165° C., respectively (FIG. 1). After preheating, the preheating panel was transferred between the upper and lower molding molds, and the skin material was faced towards the upper mold. Immediately, the preheating panel was contacted to the periphery of the upper mold through the peripheral part of skin material to form a closed space as shown in FIG. 2. Then, the vacuum suction from the holes 3 of the preheating panel was stopped and compressed air was supplied from the holes 3. Simultaneously, the skin material was vacuum sucked from the holes 11 of the upper mold. The skin material the periphery of which was fixed was transferred and sucked on the molding surface of upper mold by the compressed air from the lower mold and vacuum suction from the upper mold while the skin material was stretched along the molding surface 10 of the upper mold (FIG. 3).

Figure 4:
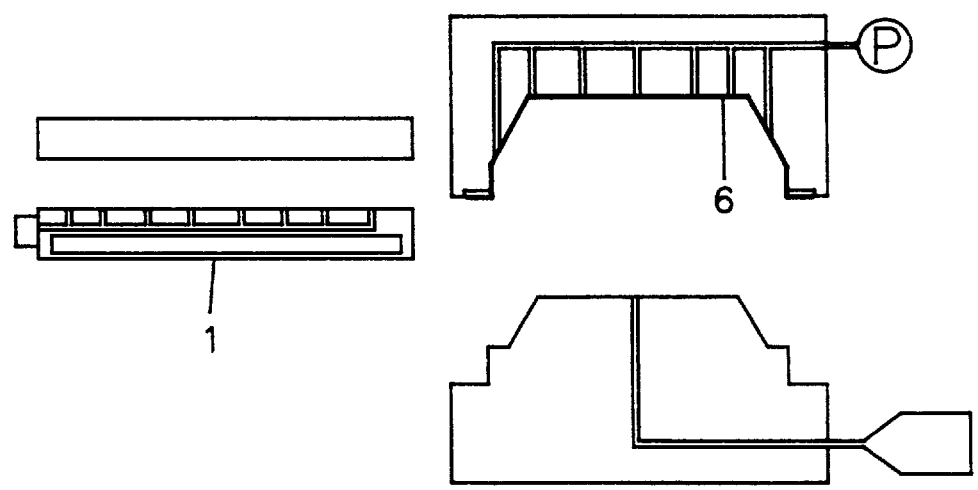

After the skin material was sucked on the upper mold surface, the supply of compressed air from the preheating panel was stopped and the preheating panel was returned to the original position from the position between the upper and lower molds (FIG. 4). Then, the upper mold was lowered. When the clearance between the molding surfaces of the upper and lower molds reached 10 to 7 mm, with further lowering the upper mold at a mold closing rate of 8 mm/sec., as as molding resin, SUMITOMO NOBLEN BPZ 5077 (manufactured by Sumitomo Chemical Co., Ltd.; polypropylene containing 15% of talc; a melt flow index of 40 g/10 min.) was supplied from the resin conduit in the lower mold (FIG. 5). Finally, the molds were compressed till the clearance between the molding surfaces of the upper and lower molds reached 2.5 mm (FIG. 6). At this time, temperatures of the molding surfaces of upper and lower molds were 50° C. and 40° C., respectively.

The obtained multilayer molded article (15 cm×25 cm×10 cm depth) had good appearance.

Example 2

A multilayer molded article having a complicated shape was produced by the apparatus and method shown in FIGS. 7–9.

In this Example, the same skin material as used in Example 1 was preheated on a preheating panel having sizes of 135 cm×45 cm in the same manner, and the preheating panel was contacted to the frame provided around the molding surface of upper mold through the peripheral part of skin material to form a closed space using the molding surface of upper mold. Thereafter, the molding was carried out in the same manner as in Example 1. The obtained multilayer molded article (130 cm×40 cm×30 cm of maximum depth) had good appearance.

What is claimed is:

1. A method for producing a multilayer molded article having a resin body and a skin material which is laminated on a surface of the resin body, comprising the steps of:
   (1) facing a preheating panel on which a preheated skin material is placed towards one of upper and lower molds in which the preheating panel has a temperature profile, and the temperature of the skin material is varied on different portions thereof;
   (2) contacting said preheating panel with an outer periphery of said one of upper and lower molds through a peripheral part of the skin material to form an enclosed space;
   (3) evacuating said enclosed space through a hole provided in said one of upper and lower molds to suck said preheated skin material onto a surface of said one of upper and lower molds;
   (4) removing said preheating panel from said one of upper and lower molds;
   (5) supplying a molten thermoplastic resin between said skin material and the other one of upper and lower molds through a resin conduit provided in the other one of upper and lower molds, during closing of the molds or while temporarily stopping mold closing;
   (6) mating a part of said outer periphery of one of upper and lower molds with a part of an inner wall surface of the other one of upper and lower molds before the molten thermoplastic resin reaches an edge of the molds;
   (7) closing the molds to the final position so as to compress and mold the molten thermoplastic resin; and
   (8) pressing and cooling the closed molds.

2. The method for producing a multilayer molded article according to claim 1, wherein the step of contacting said preheating panel comprises forming an enclosed space by contacting a frame which is slidably movable in the mold closing direction and attached around an outer periphery of one of upper and lower molds with expansion means and the preheating panel through a peripheral part of the skin material, evacuating said closed space through the hole provided in said one of upper and lower molds to suck said preheated skin material onto the surface of said one of upper and lower molds.

3. The method for producing a multilayer molded article according to claim 1, further comprising the step of cooling said skin material subsequent to said step of removing said preheating panel and said step of supplying a molten thermoplastic resin.

4. A heat-compression molding method for producing a multilayer molded article having a resin body and a skin material which is laminated on a surface of the resin body, comprising the steps:
   (1) facing a preheating panel on which a preheated skin material is placed towards one of upper and lower molds in which the preheating panel has a temperature profile, and the temperature of the skin material is varied on different portions thereof;
   (2) contacting said preheating panel with an outer periphery of said one of upper and lower molds through a peripheral part of the skin material to form an enclosed space between said skin material and a molding surface of said one of upper and lower molds;
   (3) evacuating said enclosed space through a hole provided in said one of upper and lower molds to suck said preheated skin material onto a surface of said one of upper and lower molds;
   (4) removing said preheating panel from said one of upper and lower molds;
   (5) closing said upper and lower molds to form a cavity with a distance between the molding surfaces of said upper and lower molds of between (C+0.1)mm and (C+100)mm, wherein C is a clearance between said molding surfaces at the completion of molding, and decreasing mold closing to a rate of 30 mm/sec or less;
   (6) supplying a molten thermoplastic resin to said cavity through a resin conduit provided in the other one of upper and lower molds;
   (7) mating a part of said outer periphery of one of upper and lower molds with a part of an inner wall surface of the other one of upper and lower molds before the molten thermoplastic resin reaches an edge of the molds;
   (8) closing the molds to the final position so as to compress and mold the molten thermoplastic resin, wherein the distance between the molding surfaces of said upper an lower molds is C; and
   (9) pressing and cooling the closed molds.

5. The method for producing a multilayer molded article according to claim 1, wherein the step of supplying said molten thermoplastic resin is conducted at a low pressure.

6. The method for producing a multilayer molded article according to claim 4, wherein the step of supplying said molten thermoplastic resin is conducted at a low pressure.

7. A method for producing a multilayer molded article having a resin body and a skin material which is laminated on a surface of the resin body, comprising the steps of:
   (A) providing an apparatus comprising a preheating panel and two molds, each of the molds having a mold surface, one of the molds having at least one hole which opens to its mold surface, an outer periphery, a frame which is slidably movable in a mold-closing direction, is attached around the outer periphery through expansion means and has an end which is not connected with the expansion means, and one of the molds which does not have the at least one hole having a resin conduit;
   (B) placing a skin material on the preheating panel;
   (C) preheating the skin material on the preheating panel in which the preheating panel has a temperature profile, and the temperature of the skin material is varied on different portions thereof;
   (D) moving the preheating panel to between the molds so that the skin material faces one of the molds which has the at least one hole;

(E) conducting at least one operation selected from the group consisting of moving the preheating panel and moving the mold having the at least one hole, so that a periphery portion of the skin material contacts the end of the frame and the skin material, the frame and the mold surface of the mold having the at least one hole forming an enclosed space together;

(F) evacuating the enclosed space through the at least one hole so that the skin material is sucked onto the mold surface of the mold which has the at least one hole;

(G) removing the preheating panel from between the molds;

(H) supplying a molten thermoplastic resin to between the skin material and the mold surface of the mold having the resin conduit through the resin conduit, during closing of the molds or while temporarily stopping mold closing;

(I) closing the molds to a final position so that the molten thermoplastic resin is compressed, molded and laminated to the skin material; and (J) pressing and cooling the closed molds.

8. The method according to claim 7, further comprising the step of cooling the skin material subsequent to said step of removing the preheating panel.

9. The method according to claim 7, wherein the step of supplying the molten thermoplastic resin is conducted under a condition where a distance between the mold surfaces is between (C+0.1)mm and (C+100)mm, wherein C is a clearance between the mold surfaces at a completion of molding, and mold closing is temporarily stopped or the molds are closed at a mold closing rate of 30 mm/sec or less.

* * * * *

UNITED STATES PATENT AND TRADEMARK OFFICE
CERTIFICATE OF CORRECTION

PATENT NO : 5,820,813
DATED : October 13, 1998
INVENTOR(S): Takahisa HARA et al.

It is certified that error appears in the above-identified patent and that said Letters Patent is hereby corrected as shown below:

On the title page:

"The description in the Related U.S. Application Data" is corrected by adding after the word "abandoned" --which was filed under 35 U.S.C. 371 as the national stage application of PCT/JP92/00971 on July 31, 1992--.

Signed and Sealed this

Thirtieth Day of November, 1999

Attest:

Q. TODD DICKINSON

*Attesting Officer*   *Acting Commissioner of Patents and Trademarks*